United States Patent [19]
Pickering

[11] Patent Number: 5,884,922
[45] Date of Patent: Mar. 23, 1999

[54] CHILD TRANSPORT DEVICE

[76] Inventor: Richard E. Pickering, 8280 Southpont Ter., Duluth, Ga. 30155

[21] Appl. No.: 978,696

[22] Filed: Nov. 26, 1997

Related U.S. Application Data

[62] Division of Ser. No. 565,885, Dec. 1, 1995, Pat. No. 5,692,760, which is a continuation of Ser. No. 470,660, Jun. 6, 1995, abandoned, which is a continuation of Ser. No. 167,679, Dec. 15, 1993, abandoned, which is a continuation-in-part of Ser. No. 768,380, Sep. 30, 1991, abandoned.

[51] Int. Cl.$^6$ ............................................. B62B 7/12
[52] U.S. Cl. ..................... 280/7.17; 280/1.188; 280/210; 280/648
[58] Field of Search .................... 280/829, 1.12, 280/1.13, 1.188, 7.15, 7.17, 30, 642, 643, 648, 658, 47.38, 259, 261, 210

[56] References Cited

U.S. PATENT DOCUMENTS

| | | | |
|---|---|---|---|
| 31,872 | 4/1861 | Crandall et al. | 280/7.17 |
| 474,138 | 8/1892 | Long | 280/7.17 |
| 893,007 | 7/1908 | Mueller | 280/6.48 |
| 1,193,576 | 11/1916 | Elarby | 280/47.36 |
| 1,288,809 | 12/1918 | Benson | 280/7.17 |
| 2,402,046 | 6/1946 | Holder | 280/7.17 |
| 2,854,241 | 9/1958 | Dobrowolski | 280/7.17 |
| 2,976,912 | 3/1961 | Dias | 280/643 |
| 2,986,400 | 5/1911 | Phillips | 280/7.17 |
| 3,336,039 | 8/1967 | Chute et al. | 280/30 |
| 3,804,427 | 4/1974 | Lohr et al. | 280/249 X |
| 4,019,751 | 4/1977 | Nakao | 280/31 |
| 4,065,086 | 12/1977 | Nakao | 280/87.05 |
| 4,261,588 | 4/1981 | Kassai | 280/7.17 |
| 4,538,830 | 9/1985 | Nakao et al. | 280/647 |
| 4,660,850 | 4/1987 | Nakao et al. | 280/642 |
| 4,763,919 | 8/1988 | Nakao et al. | 280/644 |
| 4,817,982 | 4/1989 | Kassai | 280/644 |
| 4,832,361 | 5/1989 | Nakao et al. | 280/642 |
| 4,846,494 | 7/1989 | Kassai | 280/642 |
| 4,846,521 | 7/1989 | Takahashi et al. | 280/643 |
| 4,848,707 | 7/1989 | Kassai | 280/642 |
| 4,906,017 | 3/1990 | Kassai | 280/642 |
| 5,028,066 | 7/1991 | Gaith | 280/30 |

FOREIGN PATENT DOCUMENTS

| | | | |
|---|---|---|---|
| 0920469 | 4/1947 | France | 280/7.17 |
| 0498326 | 9/1954 | Italy | 280/7.17 |
| 1204463 | 1/1986 | U.S.S.R. | 280/7.15 |

*Primary Examiner*—Brian L. Johnson
*Assistant Examiner*—Michael Mar
*Attorney, Agent, or Firm*—Nolte, Nolte & Hunter

[57] ABSTRACT

A device for transporting a child to and from a play location under control and propulsion by an adult. The device combines a stroller and a toy vehicle in the same mechanism. The stroller configuration transports the child, facing forward, under adult control, to and from the play location. The stroller configuration includes a handle for propulsion and control by the adult. A toy vehicle configuration can be ridden and controlled by the child. The device can be quickly and easily transmogrified back and forth between the stroller and toy vehicle configurations. All components of the stroller configuration are stowed on board the vehicle configuration, and visa versa.

3 Claims, 16 Drawing Sheets

CHILD TRANSPORT DEVICE

This is a division of application Ser. No. 08/565,885 filed Dec. 1, 1995, now U.S. Pat. No. 5,692,760 which is a continuation of application Ser. No. 08/470,660, filed Jun. 6, 1995, now abandoned; which is a continuation of application Ser. No. 08/167,679, filed Dec. 15, 1993, now abandoned; which is a continuation-in-part of application Ser. No. 07/768,380, filed Sep. 30, 1991, now abandoned.

BACKGROUND OF THE INVENTION

This invention relates to an improved baby stroller which may be transformed into a vehicle and vice versa. During family outings, it typically occurs that infants are too young not to be transported to the site of the outing in a stroller but are old enough to have graduated to bulky toys such as tricycles and pedal-driven toy automobiles. The transport of all this bulk often makes such outings an annoying production. A need exists for a stroller which is easily transformable into a toy, thereby greatly reducing the logistics of a an excursion with the kids.

DETAILED DESCRIPTION OF THE DRAWINGS

Figure 1:
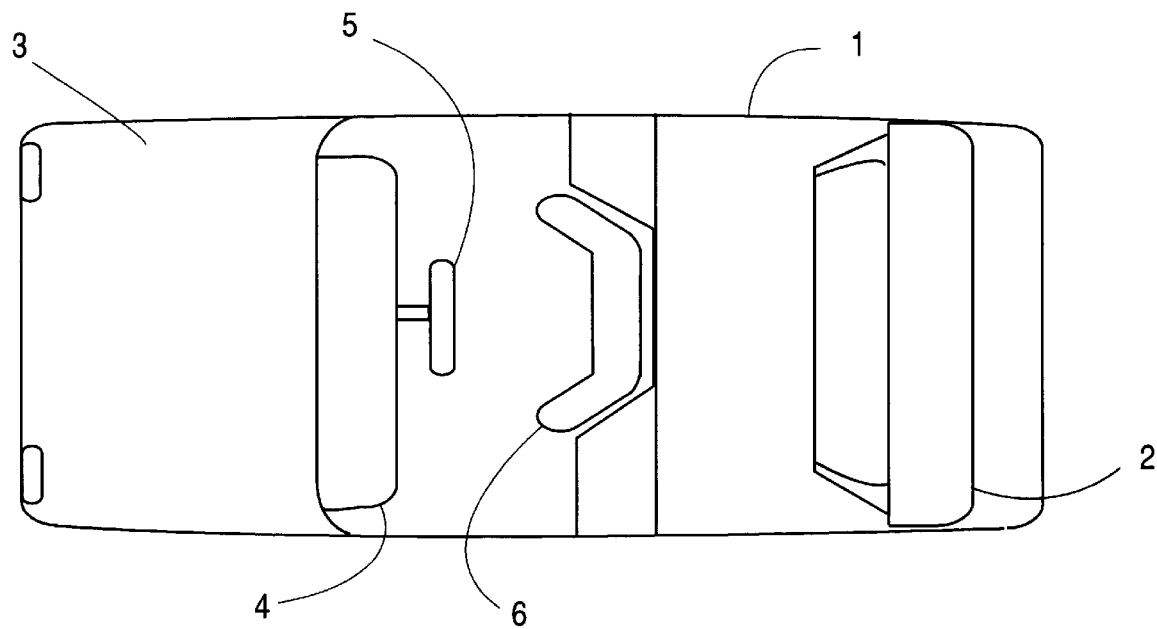
FIG. 1 is a top plan view of the invention in the toy configuration.
Figure 2:
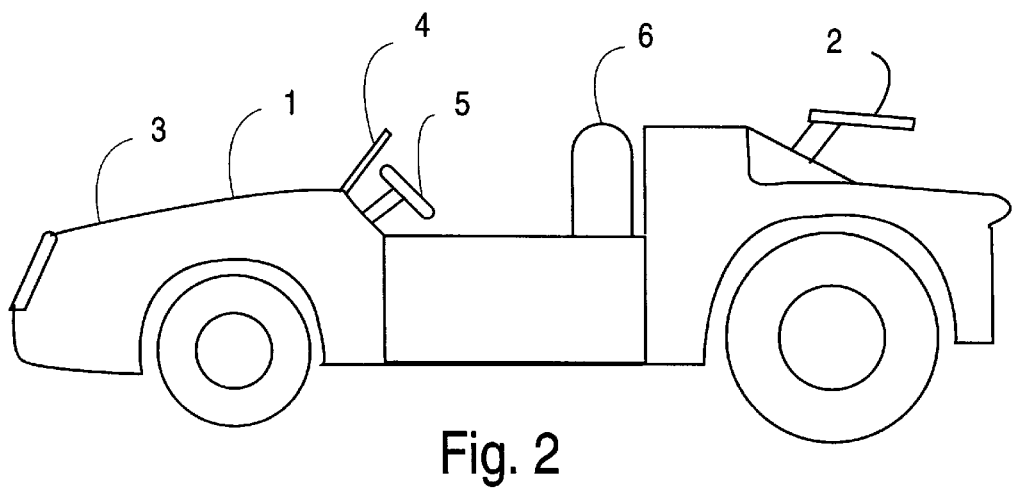
FIG. 2 is a side plan view of the invention in the toy configuration.

FIGS. 1 and 2 depict a first embodiment of the invention in the toy configuration. Here, the toy vehicle is in the form of an automobile 1, but it must be noted that the vehicle could be in the form of an airplane, boat, animal or any other creative design. For simplicity, only automobiles are depicted for the first two embodiments, having generally a body 1, rear spoiler 2, front hood 3, windshield 4, steering wheel 5, and seat 6.

As is conventional, windshield 18 is transparent plastic, allowing a relatively unobstructed full forward view in a horizontal eye-level plane for a child when his head rests upon the seat back.

Figure 5:
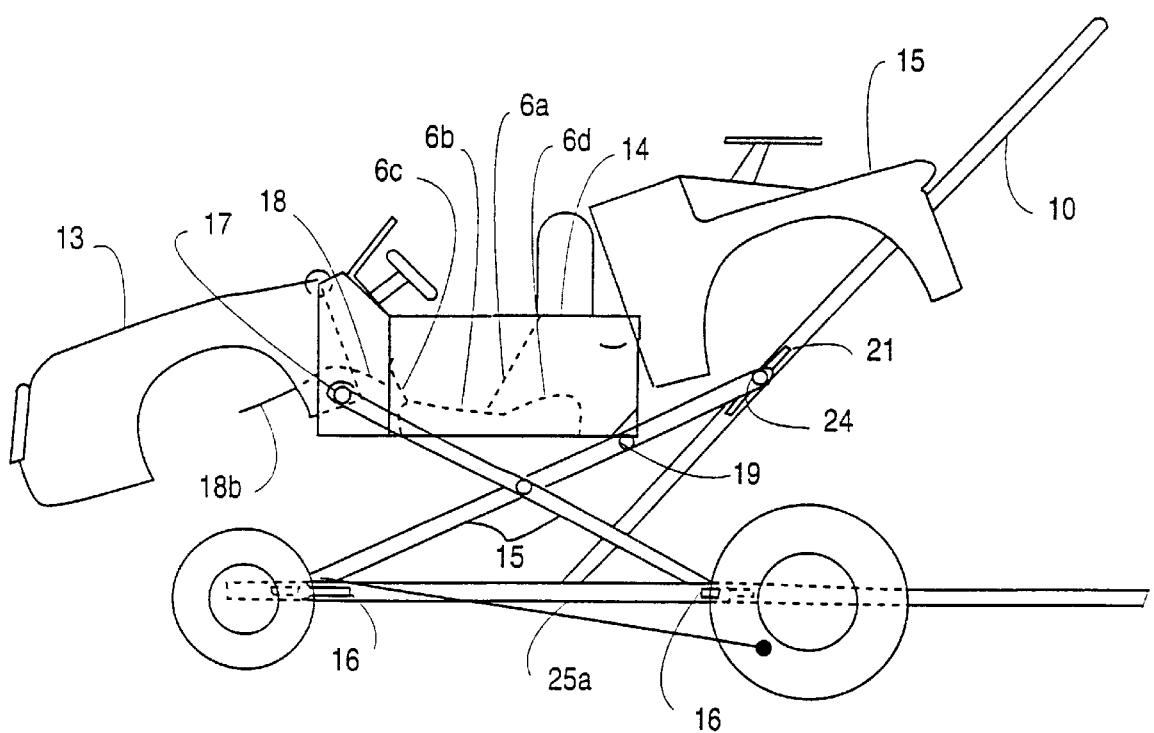
FIG. 5 is a side plan view of the invention partially transformed from the stroller configuration into the toy configuration.

Seat 6 comprises angled seat back 6A, and seat-bottom 6B shown in FIG. 5 hidden behind the car door, said seat-bottom surface angled with its kneeward edge 6C elevated above its backward edge 6D, to prevent downslip by a resting child.

Figure 3:
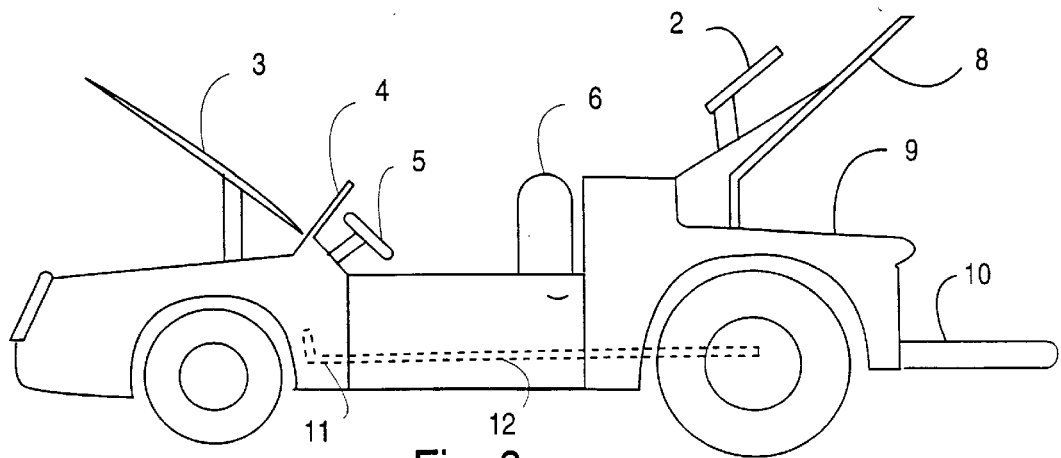
FIG. 3 is a side plan view of the invention with the hood and trunk opened up and depicting the propulsion means.

FIG. 3 depicts the front hood 3 as capable of being hinged to open as well as a rear hood 8 which may also allow for the inclusion of a convenient storage space 9.

Pedals 11 and linkage rods 12 could be used as a means of propulsion but the invention is not to be limited to any one such means. A pedal system, bicycle chain drive or a battery and electric motor could also be used.

Figure 4:
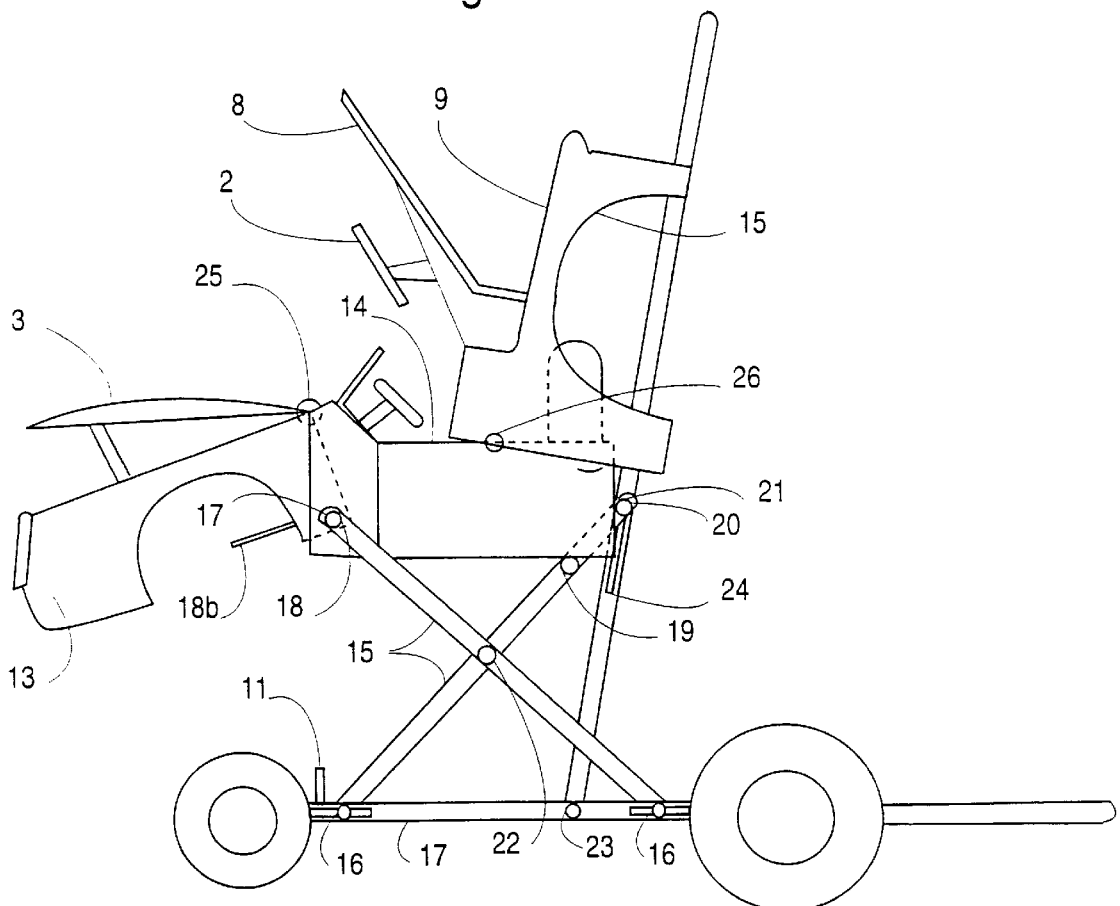
FIG. 4 is a side plan view of the invention in the stroller configuration.

FIG. 4 shows a relatively simple mechanism for converting this first embodiment of the invention into the stroller configuration. Note that the body is divided into a central portion 14 that is hingedly attached to a forward portion 13 at a hinge 25, and to a rearward portion 15 at a hinge 26.

The central portion is seen to be supported by strut means, such as cross-linkages 15, which are rotatably connected at in pin means, such as a pivot 22. The lowermost portions of the cross-linkages have slide means 16 for sliding in tracks in the chassis 7. Rollers 17 and 19 support the body at tracks 18 and 20. The handlebar 10 is hinged to the chassis 7 at point 23 and connected to one of the cross-linkages on either side of the stroller at point 21. The connection of 21 is slidably connected through groove 24. The mechanism is not entirely unlike that used to support an ironing board. Means for locking by hand, such as latch means 25A in FIG. 5, can be placed on sliders 16 and connection 21 to hold rear portion 15 of the body up.

As an option, rear spoiler 2 can be hinged to flop forward to create a sunshade and rain guard.

FIG. 5 depicts the invention partially deployed between the stroller and toy vehicle configurations.

Note that as the handlebar 10 is permitted to swing down, a connection 21 slides down groove 24 thereby allowing the cross-linkages 15 to collapse. In collapsing, sliders 16 move outward, as do rollers 17 and 19. Roller 17 engages with means 18b on the forward portion 13 of the body, thereby raising the forward portion 13 upward.

Figure 6:
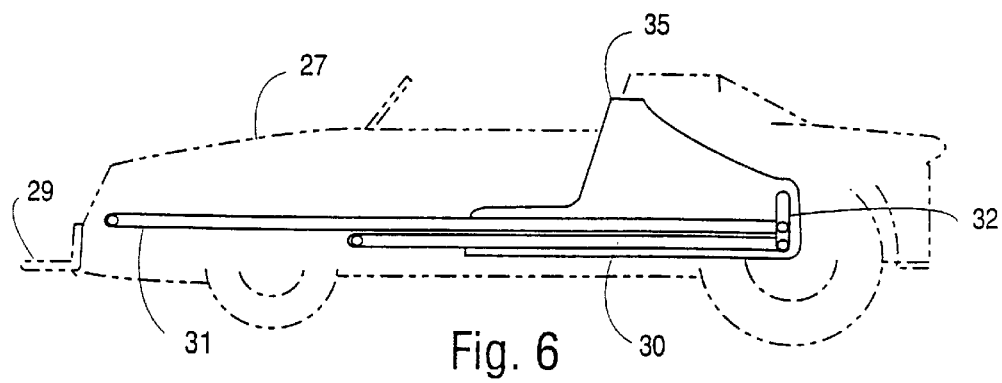
FIG. 6 is a side plan cut-away view of another embodiment of the invention in the toy configuration.
Figure 7:
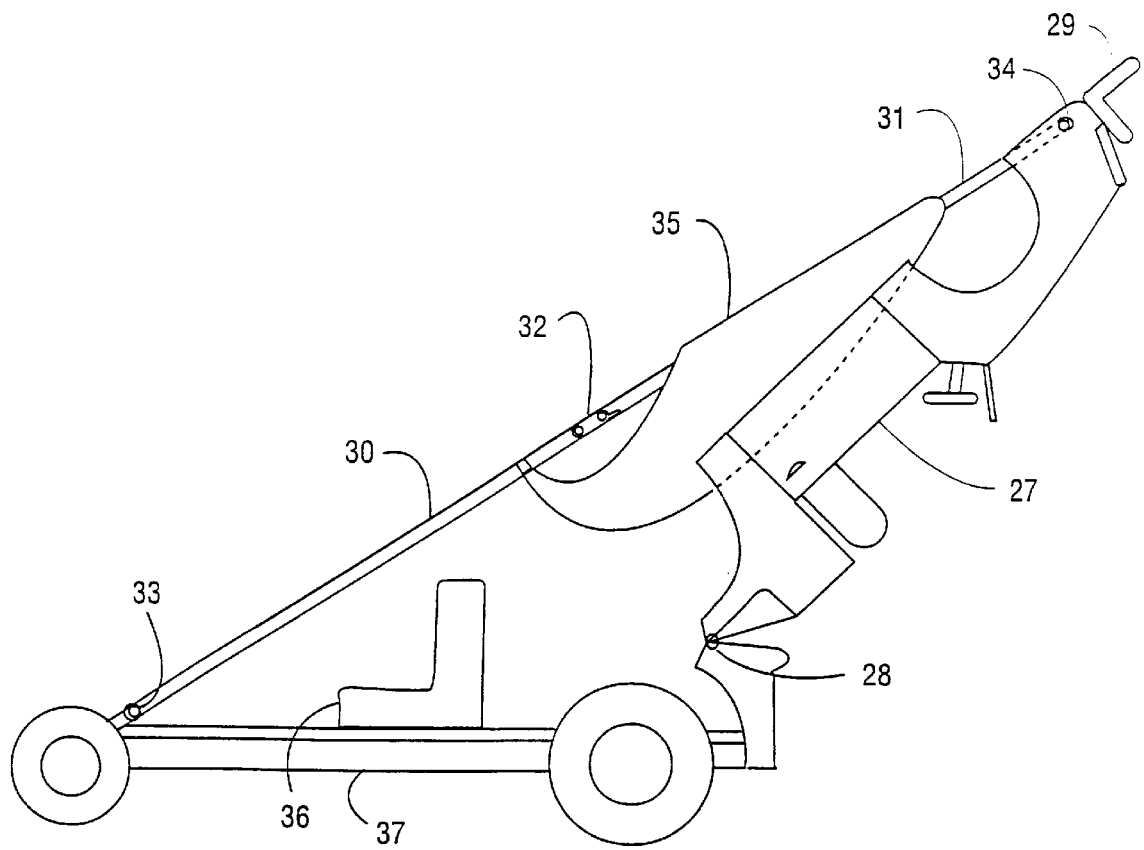
FIG. 7 is a side plan view of the embodiment of FIG. 6 in the stroller configuration.

FIGS. 6 and 7 depict a second embodiment of the invention. As shown in FIG. 7, this embodiment has a main frame 37 which is hingedly connected at hinge point 28 to a body 27. Rotatably connected to the body frame 37 is a pair of lower support beam portions 30 rotatably connected at a pivot point 33. Rotatably connected at another pivot point 34 to the body 27 is an upper support beam portion 31. The lower and upper support beam portions are themselves hingedly connected at hinge 32. The support beams, one on each side of the car, form the framework to support a stroller seat 35, made of a flexible material. Also seen connected to the frame 37 is a plastic molded seat 36. The handlebars to push the stroller comprise the front bumper 29 of the car.

FIG. 6 shows the second embodiment in the closed configuration. When closed, the lower support beam portions 30 and upper portions 31 fold at hinge 32 upon one another with the result that the cloth seat 35 is draped over the plastic seat form 36 to form a padded seat.

Figure 8:
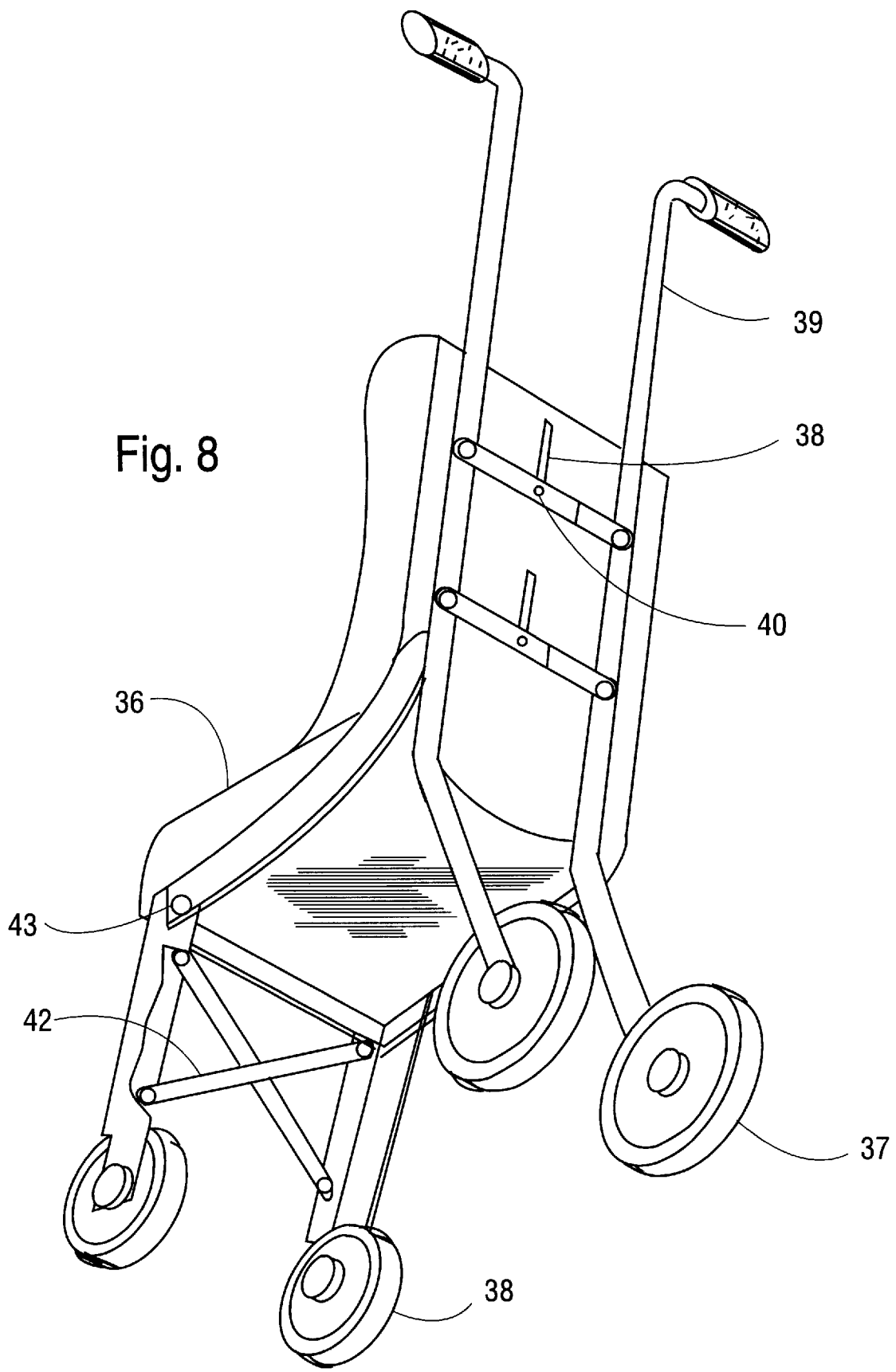
FIG. 8 is a perspective view of the third embodiment of the invention in the stroller configuration.

FIG. 8 and 8A depict a third embodiment of the invention which is a stroller which can be collapsed into a scooter. As can be seen, a seat 36 having slots 38 is connected with sliding bolts to cross braces 40. The larger rear wheels 37, which will be the scooter's forward wheel, are connected to support members 41 which are connected by a cross-link assembly 42. These forward support members 41 are connected to the frame 39 through a pivot assembly 43 and can be latched in a first and a second position with latch means that are not shown.

Figure 9:
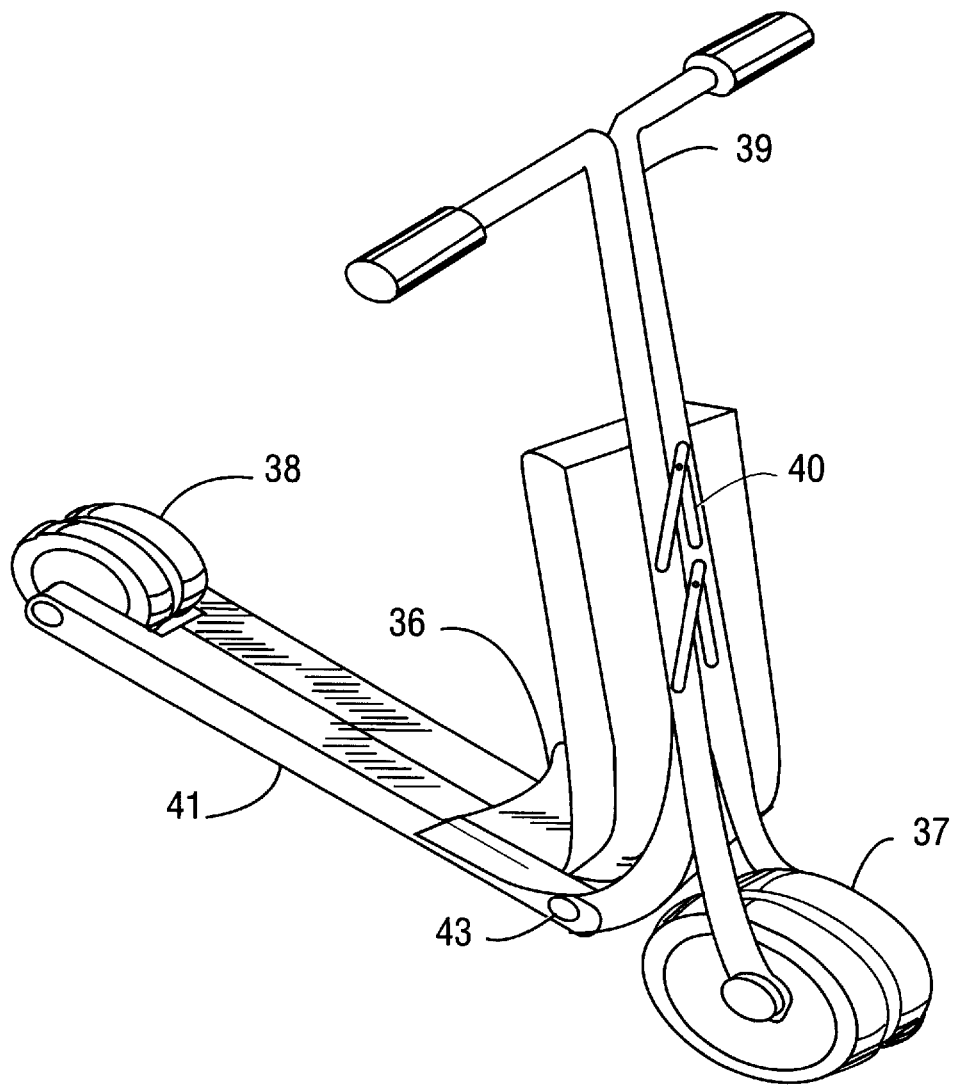
FIG. 9 is a perspective view of the embodiment of FIG. 8 in the toy configuration.

FIG. 9 shows the third embodiment of the stroller and the toy configuration. Cross braces 40 have been folded upwards thereby allowing frame 39 to collapse. Cross linkage assembly 42 has also been collapsed to allow the support members 41 to come together. The support members have been swung upward and latched in the toy configuration at the pivot assembly 43 with the result that the wheels 37 come together. It can been seen that seat 36 is angled in such a way as to permit the upward movement of the support members 41 into the scooter configuration.

Figure 10:
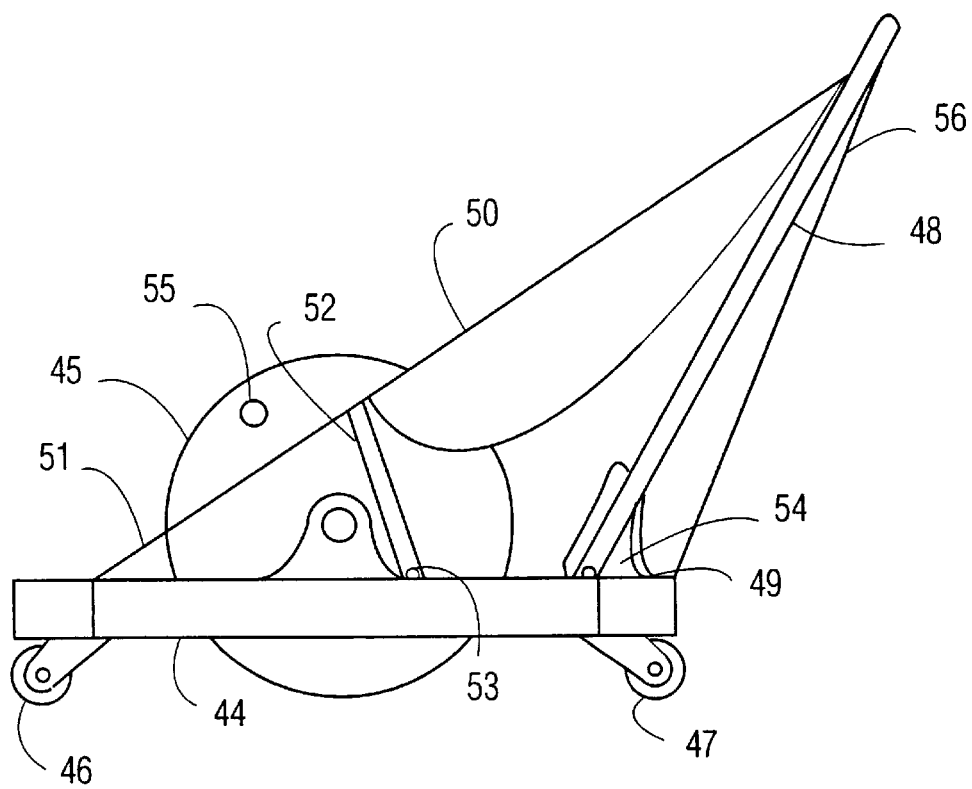
FIG. 10 is a side plan view of a fourth embodiment of the invention in the stroller configuration.
Figure 11:
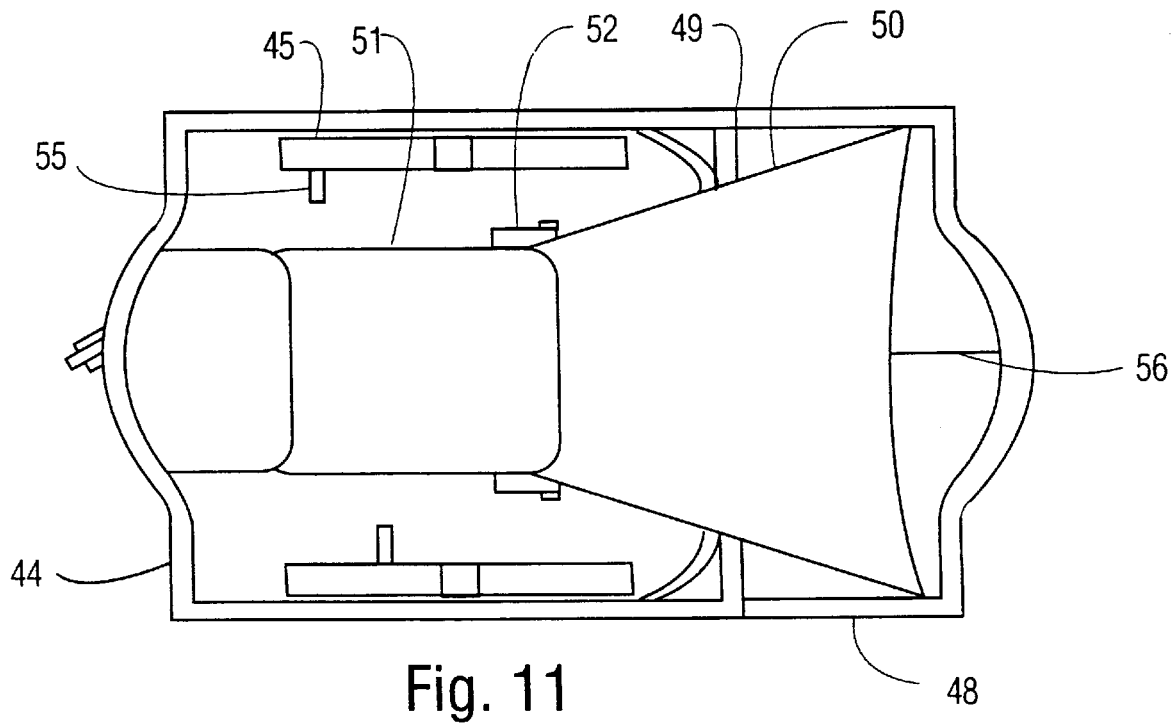
FIG. 11 is a top plan view of the embodiment of FIG. 10 in the stroller configuration.

FIGS. 10 through 13 show the fourth embodiment of the invention which converts from a stroller configuration into a "big wheel" configuration. As can be seen in FIGS. 10 and 11, a main body 44 has a small forward coaster wheel 46 and a small rearward coaster wheel 47 which rotate about a vertical axis and two large wheels 45 of which only the further one is shown in this drawing. The handle bar 48 acts as the upper support for support cords 51 which are also attached at the forward portion of the main body 44 and which also supported near their midsections by support beams 52. The support beams are pivoted at point 53 to the main body 44 to allow them to be swung down when not in use. Slung on the support cords is a hammock-type seat 50. Attached to the handle bars 48 is a seat 54 for the toy configuration. The handle bar is hinged to the main body at a pivot point 49 and is held back by a detachable wire or cord 56.

Figure 12:
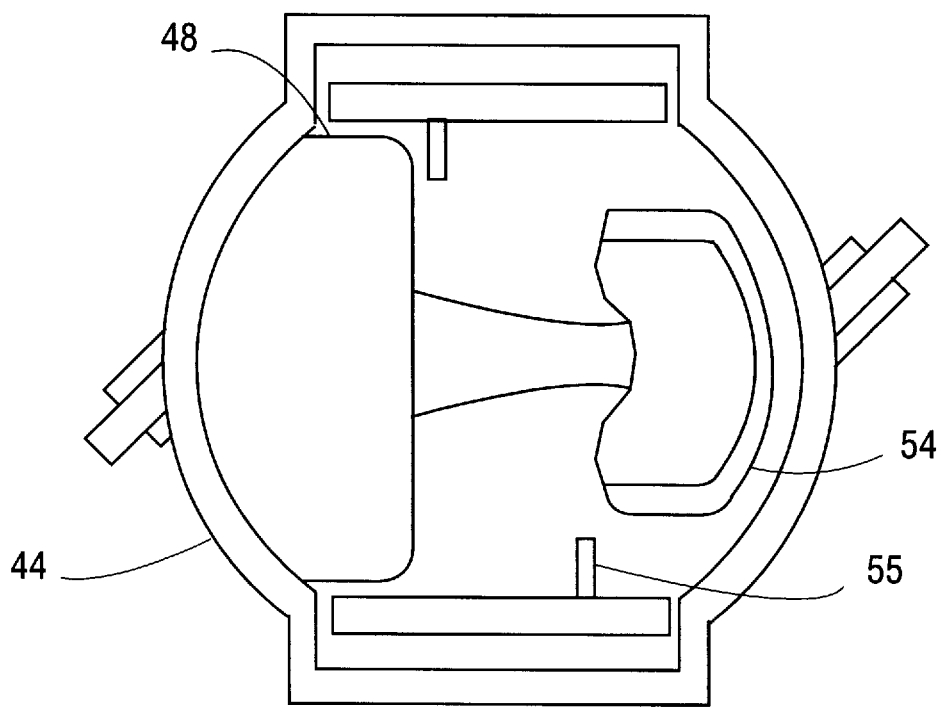
FIG. 12 is a top plan view of the fourth embodiment of the invention in the toy configuration.
Figure 13:
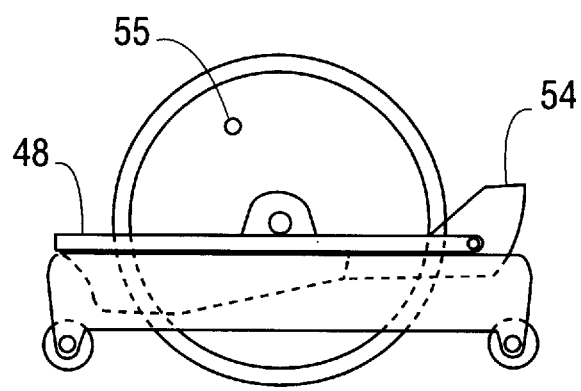
FIG. 13 is a side plan view of the fourth embodiment of the invention in the toy configuration.

FIGS. 12 and 13 show the fourth embodiment collapsed into the big wheel configuration. Support wire 56 is detached, allowing handle bars 48 to fold all the way forward on to the main body 44. As a result, seat 54 rotates down into position, allowing the child to sit in the seat and propel the two large wheels using hand holds 55. A cavity beneath the seat, not shown, is used for storage of the hammock seat.

Figure 14:
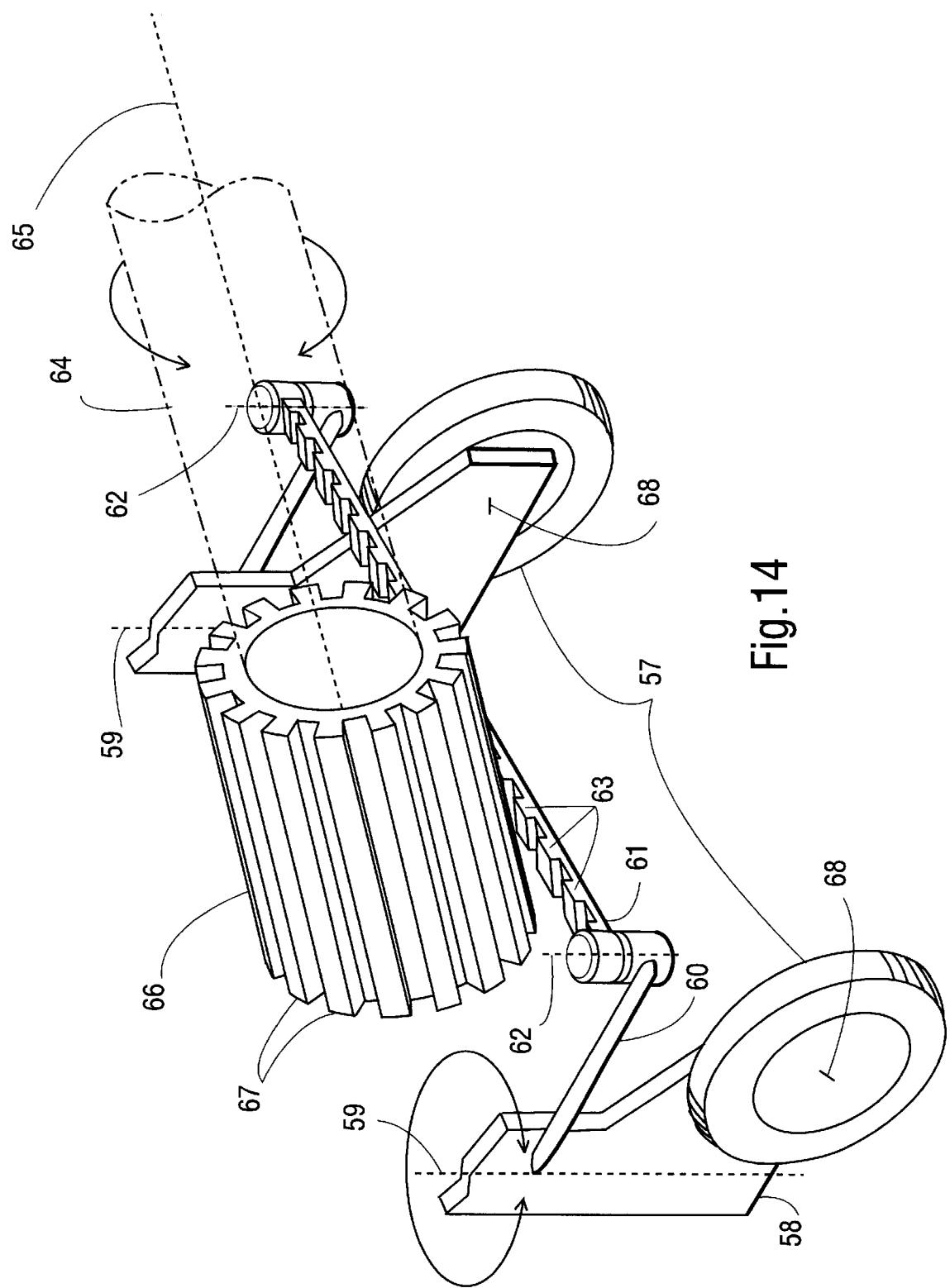
FIG. 14 is a perspective view of a steering mechanism.
Figure 15:
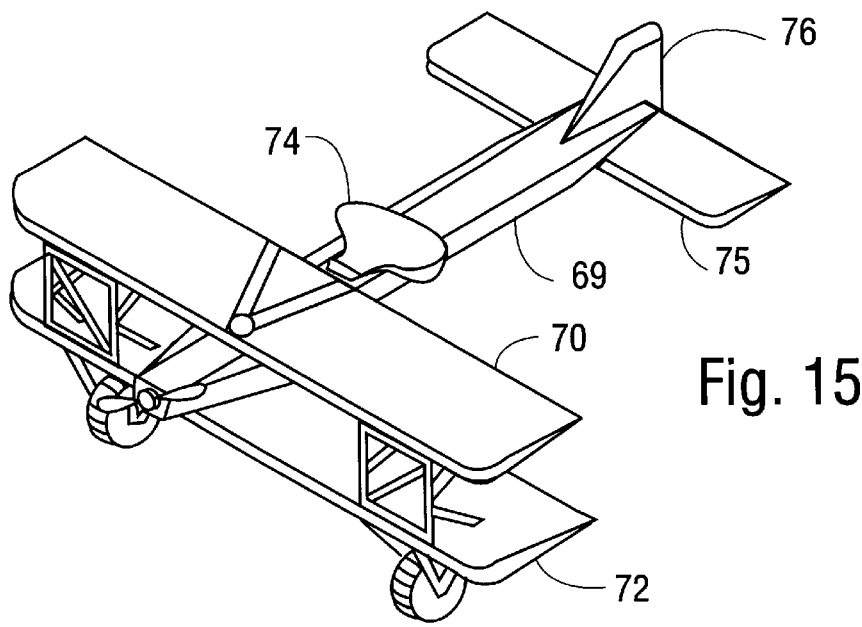
FIG. 15 is a top plan view of the fifth embodiment of the invention in a toy configuration.
Figure 16:
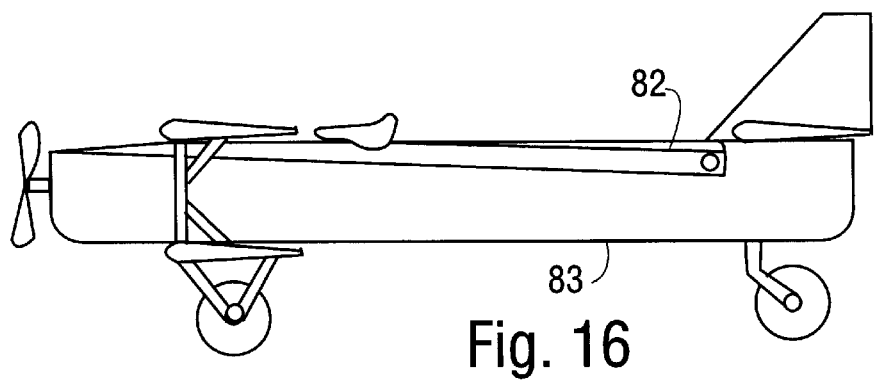
FIG. 16 is a side plan view of the fifth embodiment of the invention in a toy configuration.

FIG. 14 depicts a preferred steering mechanism for the first two embodiments of the invention. As indicated previously, the first two embodiments of the invention go from an open chassis configuration down to a closed chassis configuration. Hence, there must be some method for engaging the steering mechanism in the toy configuration and disengaging the steering mechanism when in the stroller configuration to allow the parent to control the steering of the stroller. As seen in FIG. 14, a steering column 64 which rotates about axis 65 is equipped with a toothed gear end 66 having a plurality of gear teeth 67. When the chassis is closed into the toy configuration, gear 66 engages with a gear rack 61 also having a plurality of gear teeth 63 which are angled downward at the same angle as the steering wheel shaft. The gear rack 61 is rotatably connected to levers 60 at axes of rotation 62. Lever 60 are connected to wheel supports 58 which are connected to the body frame of the vehicle through axes of rotation 59. To these are attached wheels 57 each of which has an axis of rotation 68 located behind axis of rotation 59 in the manner of a caster wheel. Hence, when the invention is in the stroller configuration and the steering column is disengaged from the gear rack, steering can be accomplished by the adult pushing the stroller by applying torque to the stroller with the handle bars.

FIGS. 15 through 19 depict the fifth embodiment of the invention where, in this case, the toy vehicle is in the shape of a biplane having a lower wing 71, an upper wing 70 and a fuselage 69 and an empenage consisting of elevators 75 and rudder 76. On the front is a toy propeller 77. The wheels are in a taildragger configuration, comprising two forward wheels 72 and a rear wheel 73. A seat 74 rests on top of the fuselage. The fuselage itself is comprised of two portions, a lower portion 83 and an fuselage portion 82, which are hinged at a point 78. The upper wing 70 is attached to the upper portion of the fuselage.

Figure 17:
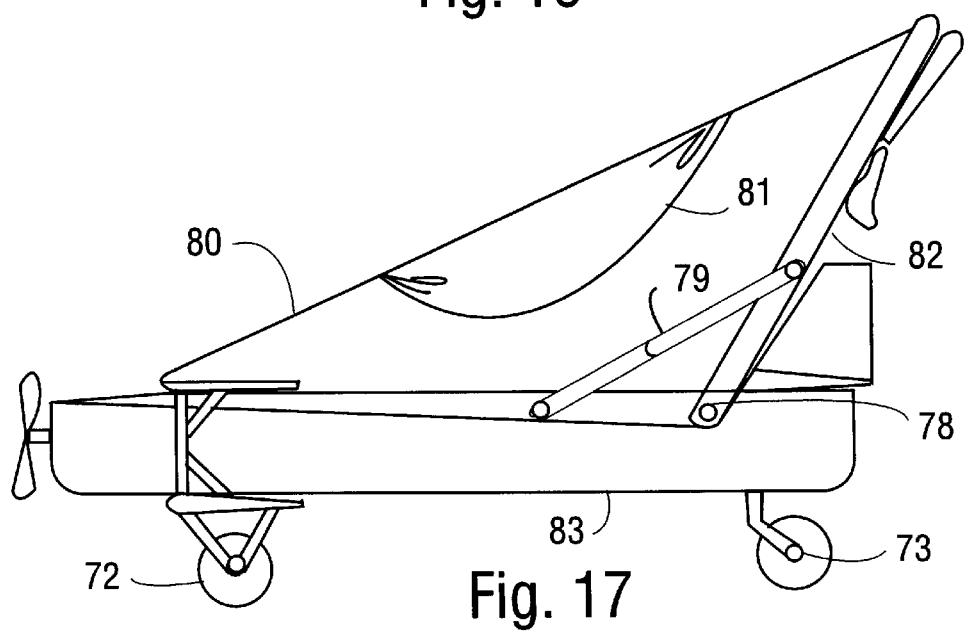
FIG. 17 is a side plan view of the fifth embodiment of the invention in a stroller configuration.
Figure 18:
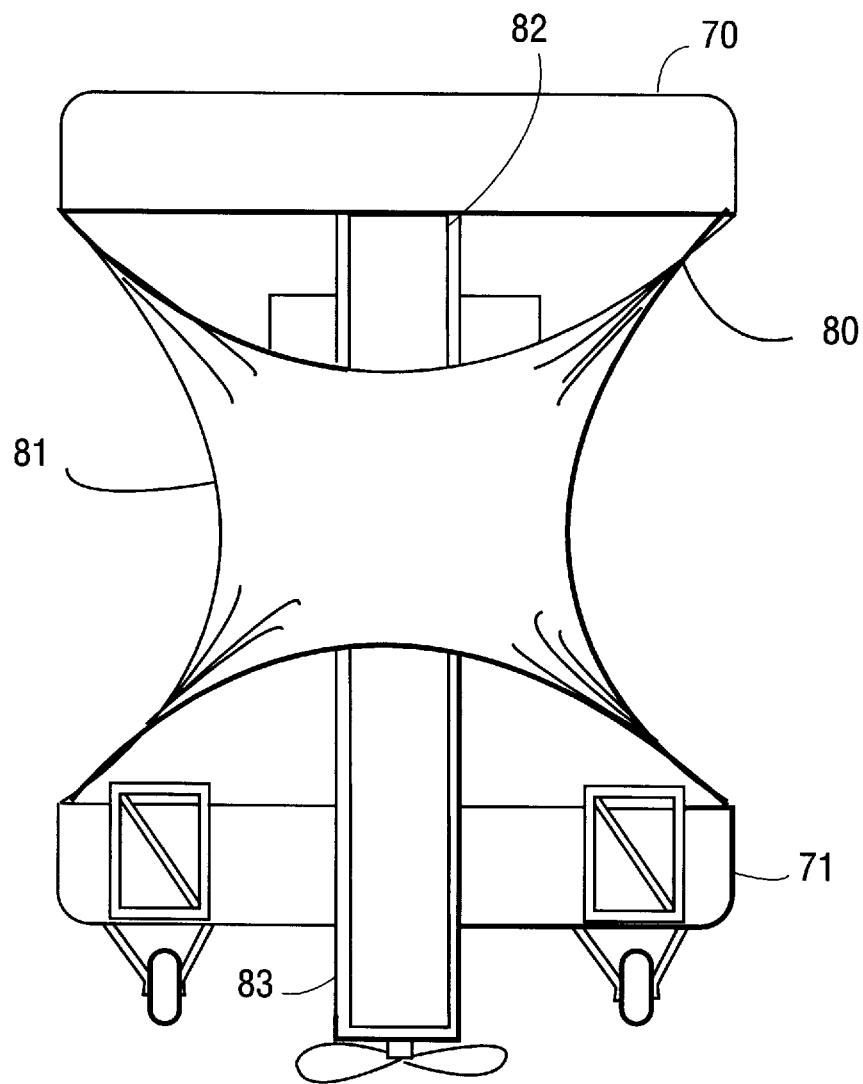
FIG. 18 is a top plan view of the fifth embodiment of the invention in a stroller configuration.

FIG. 17 and show 18 the embodiment opened up with means 79 of holding the upper fuselage portion 82 in the open configuration and thereby permitting the mounting of cables 80 to support a sling-type seat 81. The upper wing 70 may then act as handle bars in the stroller configuration.

Figure 19:
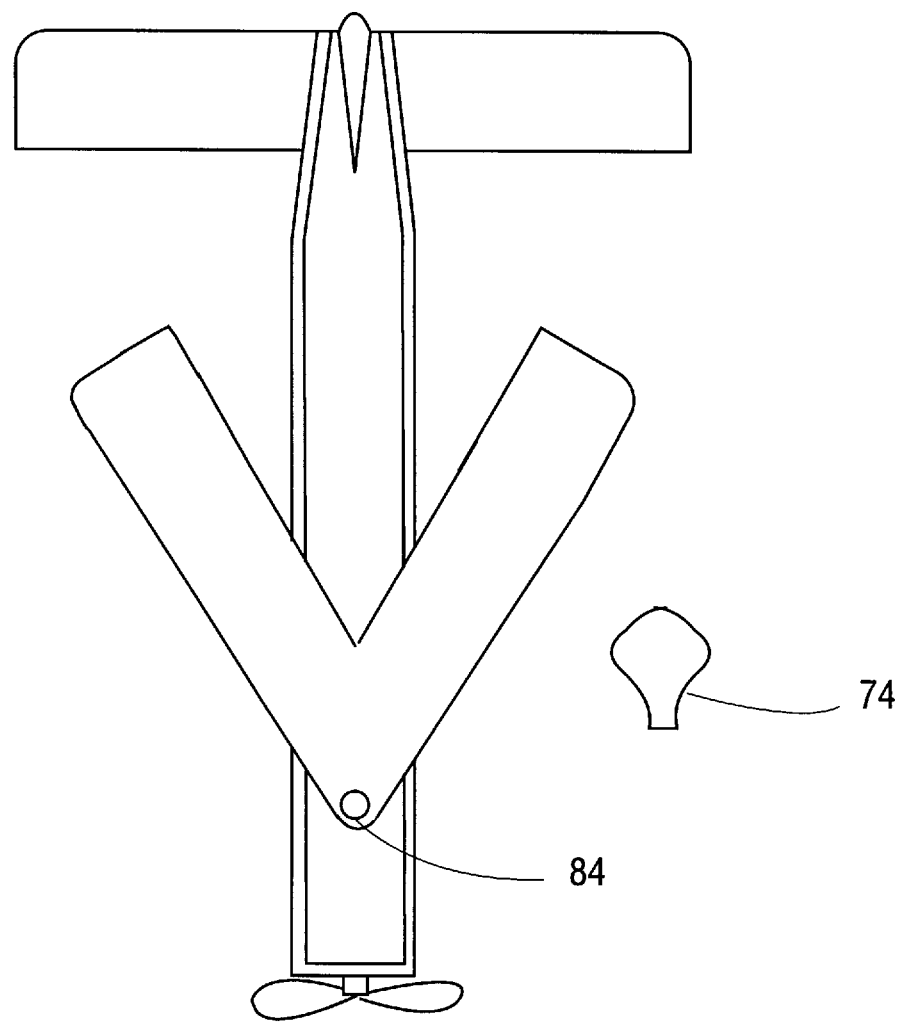
FIG. 19 is a top plan view of a fifth embodiment of the invention in a storage configuration.

FIG. 19 shows an additional option wherein the seat 74 is removable and the wings may be folded back at a pivot point 84 to allow the invention to be easily stored.

Figure 20:
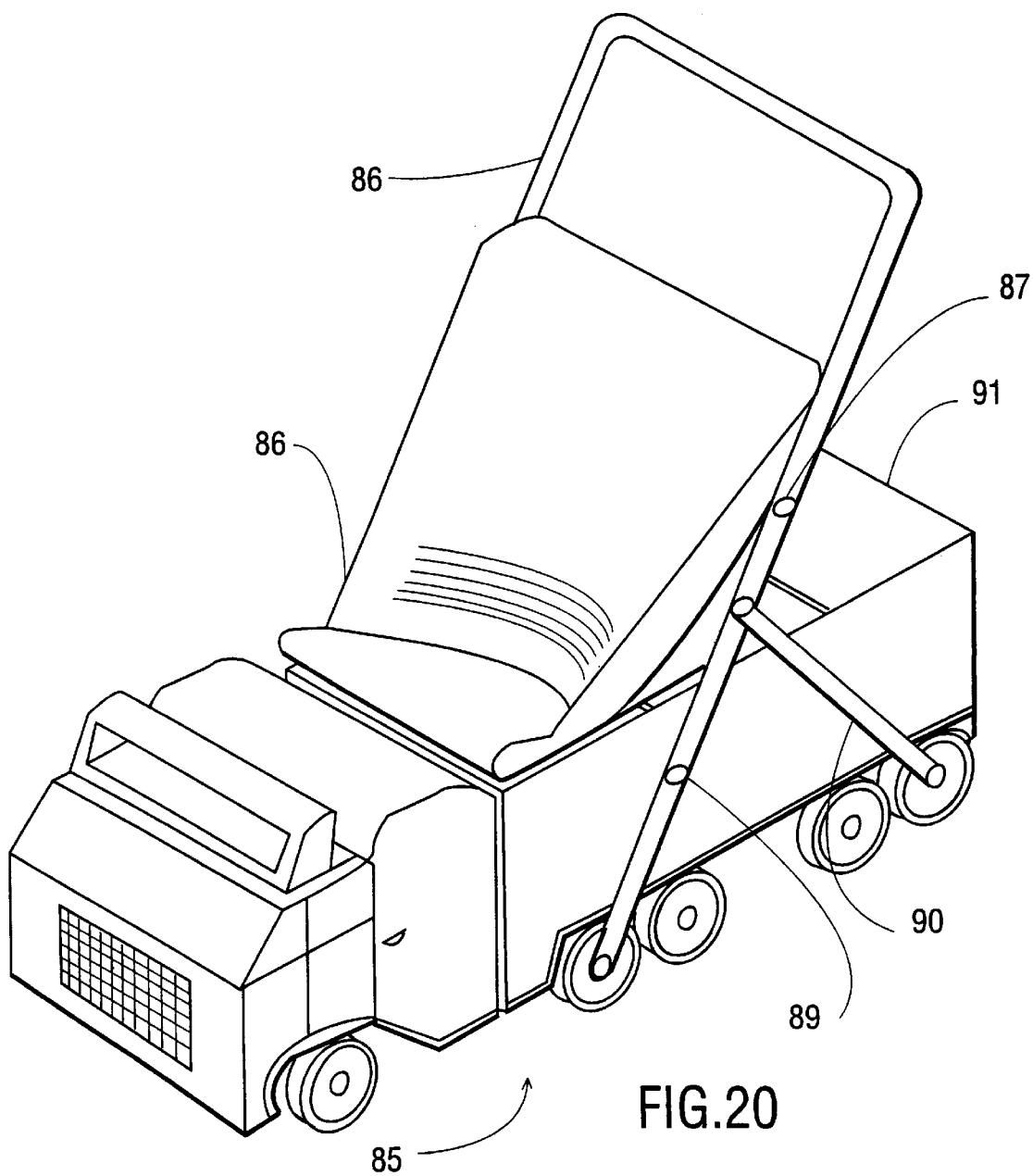
FIG. 20 is a perspective view of a sixth embodiment of the invention.

FIG. 20 shows a sixth embodiment of the invention comprising a toy truck 85 having a hollow interior 91. The propulsion means are not shown in this diagram. The seat 86 is gimbaled at gimbal axis 87 and can be locked into position. The figure shows the embodiment in a stroller configuration. Transmogrification to the toy configuration is accomplished by unlatching means at pivot 89 which are not shown and swinging handlebars 88 downward causing pivot point 89 to fold forward and support arm 90 to swing downward with the result that the gimbaled seat is lowered into the cavity 91 and handlebars 88 are moved to a horizontal position.

Figure 21:
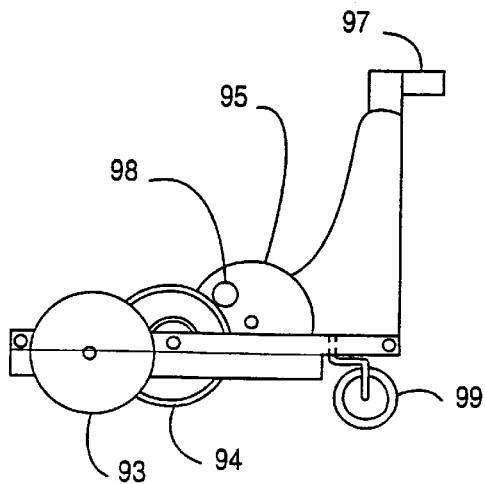
FIG. 21 is a side plan view of the seventh embodiment of the invention in the toy configuration.
Figure 22:
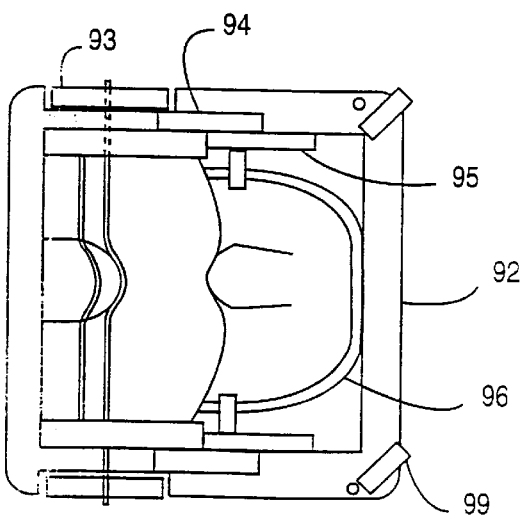
FIG. 22 is a top plan view of the seventh embodiment of the invention in the toy configuration.
Figure 23:
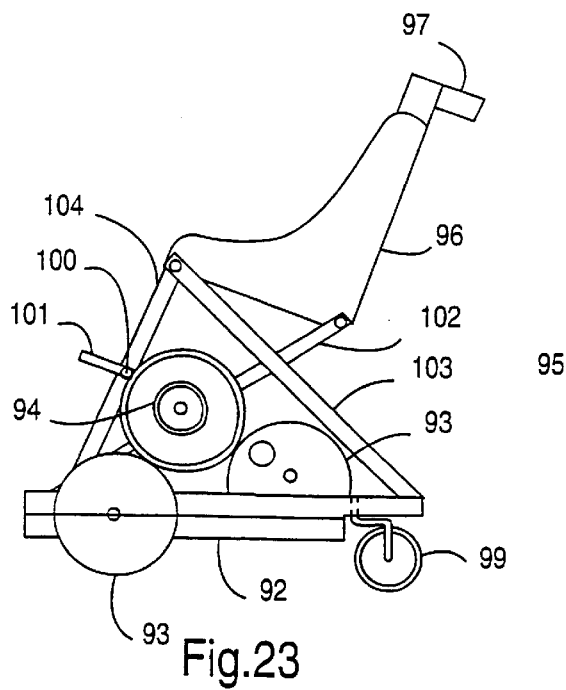
FIG. 23 is a side plan view of the seventh embodiment of the invention in a stroller configuration.

FIGS. 21 through 23 show a seventh embodiment of the invention, comprising a frame 92 having a set of small coaster wheels 99 mounted in the rear and three sets of drive wheels. The primary hand drive wheel 95 having a handle 98 to impart motor power by hand and intermediate wheel 94 which provides for a low gear ratio and transferring the motion imparted to the primary drive wheel 95 to the actual support wheel 93.

FIG. 23 shows the embodiment in open position wherein chair 96 and handlebars 97 are supported above the frame 92 by a plurality of support members 102, 103 and 104. No specific mechanism is to be construed as limiting this invention. In the diagram is shown one possibility wherein the forward support structure 104 is pivoted at its center at point 100 and kept rigid by locking means not shown. When unlocked, pivot 100 would fold inward and toward the rear of the device thus allowing support structures 102 and 103 to collapse downward. In this particular embodiment, the gear wheel 94 is mounted on the frame so that when the invention is collapsed into the toy configuration, it will engage the primary drive wheel 95 and the support wheel 93. A set of foot supports 101 can be mounted to the forward support struts 104.

Figure 24:
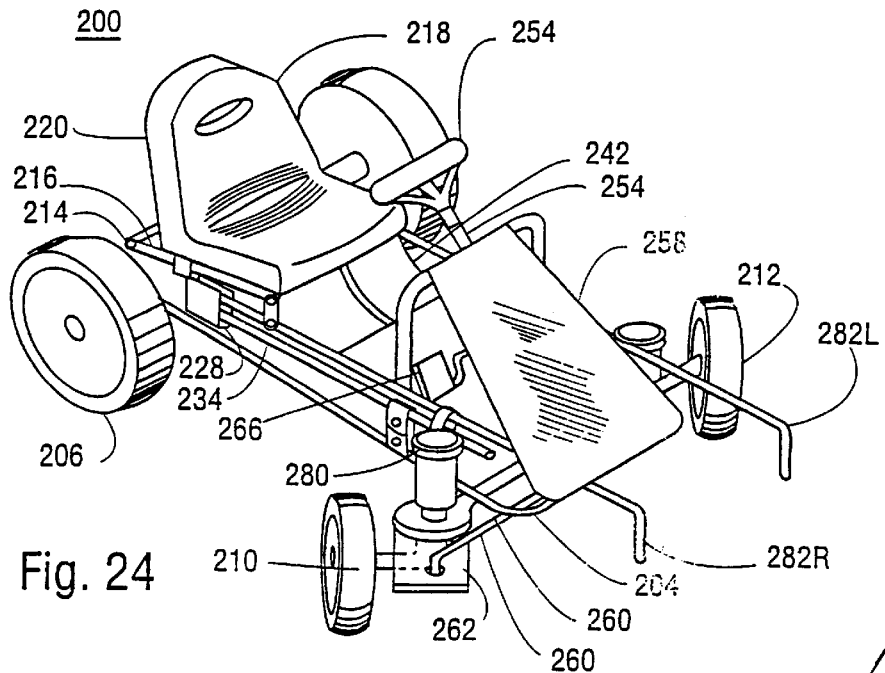
FIG. 24 is an oblique view of a toy configuration of the presently preferred embodiment of the toy, comprising a go-cart.

FIG. 24 shows a presently preferred embodiment in its toy configuration, the toy comprising a go-cart, generally designated 200. The toy configuration comprises a means for propulsion control and steering control by the child.

Figure 25:
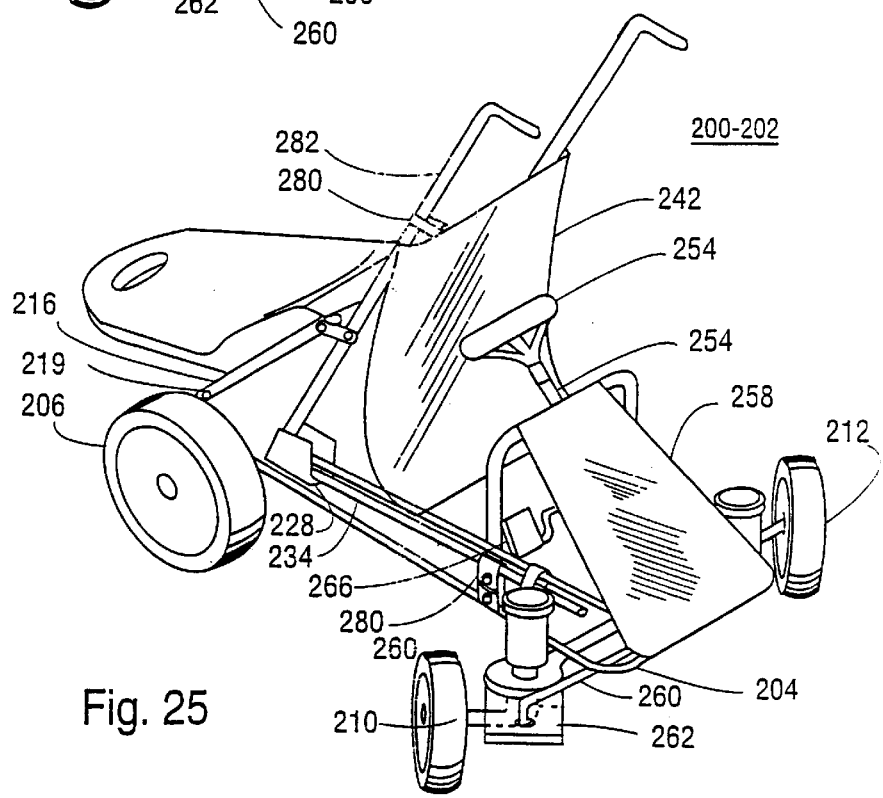
FIG. 25 is a similar view of this embodiment during transmogrification from go-cart to toy.
Figure 26:
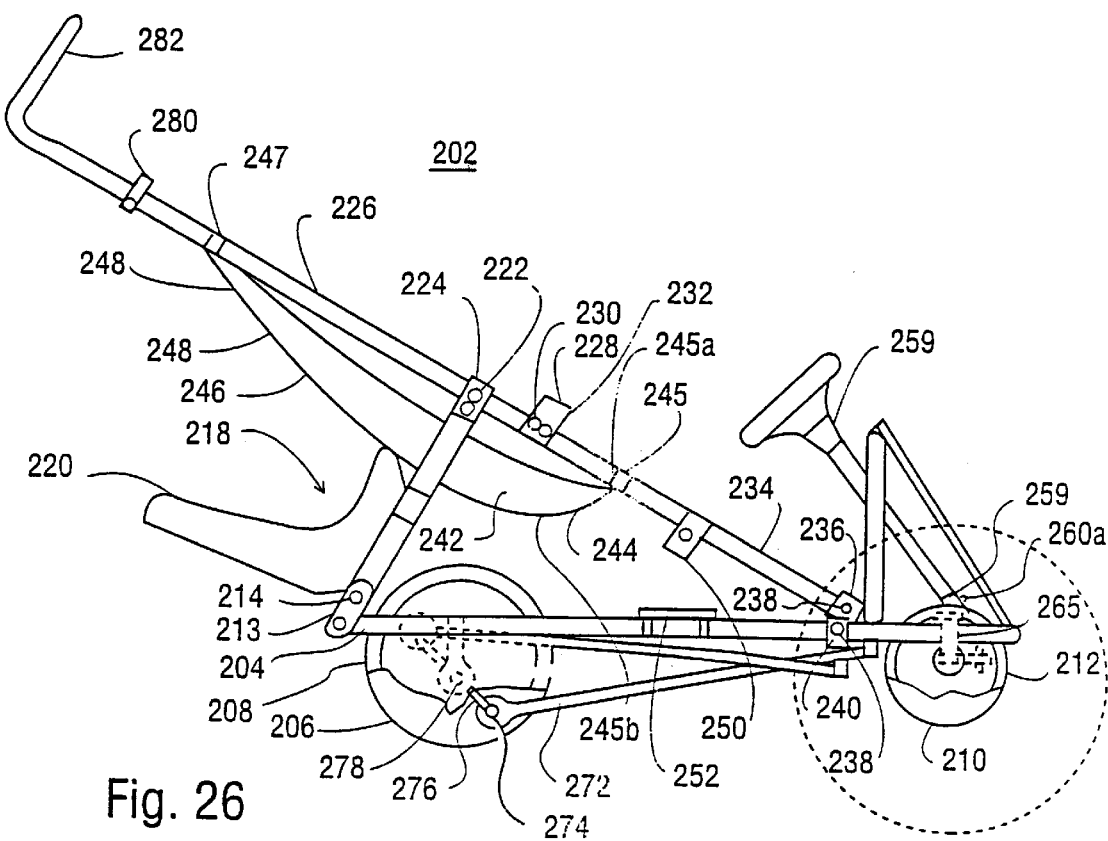
FIG. 26 is an elevation of this embodiment taken in partial section through the right side wheels, showing the stroller configuration.

FIG. 25 shows this presently preferred embodiment in its intermediary stage, generally designated 200-202. FIG. 26 shows the stroller configuration, generally designated 202. The stroller configuration provides an adult with means for propelling, controlling, and transporting the child and all components of both the toy and stroller configurations. As seen in FIG. 24, the embodiment comprises a frame 204 to which are mounted wheels 206, 208, shown in FIG. 26, and wheels 210 and 212, shown in FIGS. 24–26.

To this frame 204 is mounted aftmost hinge 213 on which aftmost pin 214 rotatably mounts aft strut 216, all shown in FIG. 26. The toy configuration has means for the child to ride, such as riding seat means. Go-cart seat 218 which comprises a go-cart seat back 220, which in FIG. 26 has been tilted so that seat back 220 comprises a package shelf.

At the top of aft strut 216 is aft strut's top pin 222, which rotatably mounts said strut to aft strut's top hinge 224, which is fixedly mounted to handle strut 226 which serves as strut means for supporting handle 282. At its forward end, handle strut 226 is pinned by pin means such as pin 230 to center hinge 228, which is also pinned by hammock bottom-strut pin 232 to hammock bottom-strut 234. Center hinge 228 is a U-shaped plate, closed underneath and open at the top, having an open top portion slightly flexibly smaller than the tubing diameter of the struts which it joins, so as to serve as a latching means for locking by hand or hand locking means, to hold the two struts in a straight line relative to each other. As a latch it can pressed down to bring the two struts out of column and allow them to fold approximately 180 degrees to each other.

Hammock bottom strut 234 is mounted at its lower end to hammock bottom-strut support 236. Depending on frame geometry, support 236 may be affixed to bottom-strut 234 or may be slidably mounted as a latching mount. Support 236 is pinned by rotatable pin 238 to frame clamp 240.

Said above pin means, and locking means serve as means for transmogrifying said device between said stroller configuration and said toy vehicle configuration. Said transmogrifying means specifically serve as means for:

easily and quickly transmogrifying said device from stroller configuration to the stroller configuration to the toy vehicle configuration after transporting the child to the play location, and easily and quickly transmogrifying said device from the toy vehicle configuration for transporting the child from the play location.

All components of the toy configuration stow aboard the stroller, thus said device comprises means for stowing all components of the toy vehicle configuration on-board the device in the stroller configuration and visa versa. For example:

the seat 218 becomes a package shelf, and the bumpers 282 of FIG. 24 transmogrify in FIG. 25 into handles 282 of FIG. 26.

Hammock 242 is slung between struts 226 and 234. Hammock 242 comprises a forward-facing seat for the child. Hammock 242 comprises stroller seat bottom 244, mounted by kneeward mount 245 at its kneeward edge 245A. At the bottom of the hammock the backward part of seat bottom 245B adjoins stroller seat back 246. The upper portion of stroller seat back 246 is mounted at headward edge mount 247 just above a means for supporting and resting the child's head, such as the head rest portion 248 of the seat back 246. The lower part 246b of seat back 246 serves as means for comfortably supporting and resting the child's back. Hammock 242's flexible fabric makes it a means for folding itself as in FIG. 25 with struts, and for stowing under the seat 218 in the toy configuration as in FIG. 24. Slung from hammock bottom strut 234 may be a leg rest strap 250 which may be slidably mounted on said strut. Alternatively or additionally a foot rest 252 may be slidably mounted on frame 204. The foot rest or leg rest or both may serve as means for engaging and holding the child's legs and feet passively clear of the ground, and disengaged from the child's propulsion means to keep the child's feet off the ground in the stroller configuration. The child's legs are supported lower than his bottom, as in FIG. 26, by a leg rest 250 lower than the seat bottom 244.

In FIG. 24 the go-cart configuration comprises a steering wheel 254 mounted on a child's steering control means such as steering column 256 which is mounted to dash bar 257 and hood 258 by mounts 259 shown in FIG. 26.

Figure 27:
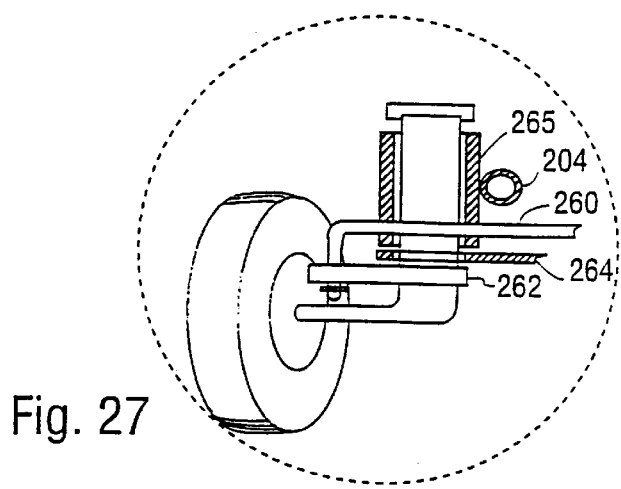
FIG. 27 is a front elevation detail of the area circled in FIG. 26.

At the lower end of steering column 256 is steering arm 260 which actuates, by tie-rod 261, pin 260A, which moves rocker arms 262, which rotate the front wheels 210 and 212 left-to-right, to allow steering by the child in the go-cart configuration. See also FIG. 27.

Pin 260A may be easily disengageable as, for example, a fast-pin on a lanyard, to disengage the steering wheel, but since the steering wheel is not easily reached by the child's hands in the stroller configuration, such disengagement should usually be unnecessary.

Front axle beam 264 helps strengthen the front end between the wheel mounts 265. See also FIGS. 24–27.

In this embodiment propulsion is provided by the child's propulsion control means such as pedals 266 mounted by pedal pins 268 to dash bar 257.

Pins 270 link the pedals 266 to power rods 272. Each power rod 272 is pinned by crank arm pin 274 to crank arm 276, which rotates crank shaft 278, which is coupled to rear wheels 206 and 208 to provide propulsive power from the child's feet to the rear wheels of the go-cart. As shown in FIGS. 24–26, clothes-pin-like latch 280 press-fits between strut 226 and strut 234 to hold the cart in the go-cart position. Pulling up on right handle 282R unlatches this press-fit latch 280 and allows the handles, 282 L & R, which in the toy configuration serve as bumper means 282 L & R, FIG. 4 to be rotated upward as shown in FIG. 25 through the intermediate condition. FIG. 26 shows handles 282 as handle means for adult propulsion and control of the stroller configuration. Seat back 220 tilts back toward its package-shelf configuration from the go-cart configuration as the handles are rotated until hinge 228 latches struts 226 and 234 into a straight line relative to each other, and the embodiment is thereby transmogrified from the toy configuration to the stroller configuration.

In the stroller configuration kneeward edge 245A of hammock 242 is above the backward part of the seat bottom 245B, providing a sloping surface which serves as means for preventing the child's bottom from slipping down and out of the stroller seat or hammock. As an alternative to this means for preventing downslip and forwardslip, a non-skid surface for the seat bottom, or a crouch strap may also be employed. Head-rest portion 248 of seat back 246 supports the child's head in a semi-reclining position, so that the child can sleep comfortably and securely in the hammock while being pushed in the stroller configuration.

Head rest portion 248 is, for a child of the intended size, above all forward portions of the stroller. The child's eyes have an unobstructed view in the horizontal forward plane, so that the child, when awake, can easily see where it is going. This is a definitional distinction between a stroller and a baby carriage, in that a baby carriage is intended for a fully reclining infant and usually has a sun shade which, if the child were facing forward, would obstruct the child's forward view. As a further distinction, there is no provision in a baby carriage to prop up the infant against a backrest with a reactive surface sloped against the infant's bottom to as means for preventing forward and downward slipping or forwardslip and downslip when the child is in the semi-reclining posture.

I claim:

1. A wheeled device for transporting a child, said device convertible between a stroller configuration for an adult to control, propel, and transport the child, and a toy vehicle configuration for riding by the child, said device comprising:

a single seat means for supporting the child, said seat means facing forward in said stroller configuration and providing an unobstructed forward view in said stroller configuration, and for seating the child in the toy vehicle configuration;

means for propelling the wheeled device and a propulsion control engagable by legs or feet of the child in said toy vehicle configuration;

leg rest means deployable in the stroller configuration for supporting the child's legs or feet clear of the ground and of the propulsion means, the leg rest means being movable to a location which is clear of said legs in the toy configuration for allowing said legs to engage said propulsion control, said leg rest means, being located lower than said seat means in said stroller configuration;

handle means for propulsion and control of the wheeled device by the adult in said stroller configuration;

steering means for controlling at least one steerable wheel by the child in said toy vehicle configuration;

said steering means being disengaged from the at least one steerable wheel in the stroller configuration; and strut means for converting said device between said stroller configuration and said toy vehicle configuration, said seat means being attached to said strut means and movable between a stroller raised position and a lowered toy vehicle position, said strut means supporting said handle means in said stroller configuration; and locking means for locking said strut means in a desired one of said positions.

2. A wheeled device for transporting a child, said device convertible between a stroller configuration for an adult to control, propel, and transport the child, and a toy vehicle configuration for riding by the child, said device comprising:

a single seat means for supporting the child, said seat means facing forward in said stroller configuration and providing an unobstructed forward view in said stroller configuration, and for seating the child in the toy vehicle configuration;

means for propelling the wheeled device and a propulsion control engagable by legs or feet of the child in said toy vehicle configuration;

leg rest means deployable in the stroller configuration for supporting the child's legs or feet clear of the ground and clear of the propulsion means, the leg rest means being movable to a location which is clear of said legs in the toy configuration for allowing said legs to engage said propulsion control, said leg rest means being located lower than said seat means in said stroller configuration;

handle means, for propelling and for control of the wheeled device, by the adult, in said stroller configuration;

steering means for controlling at least one steerable wheel by the child in said toy vehicle configuration; and strut means for converting said device between said stroller configuration and said toy vehicle configuration, said seat means being attached to said strut means and movable between a stroller position and a toy vehicle position, said strut means supporting said handle means in said stroller configuration;

locking means for locking said strut means in a desired one of said positions; and a body portion attached to the strut means and fixedly attached to the seat means.

3. A wheeled device according to claim 2 in which said steering means is disengaged from the at least one steerable wheel in the stroller configuration.

* * * * *